US010043500B2

(12) United States Patent
Quattro et al.

(10) Patent No.: US 10,043,500 B2
(45) Date of Patent: Aug. 7, 2018

(54) METHOD AND APPARATUS FOR MAKING MUSIC SELECTION BASED ON ACOUSTIC FEATURES

(71) Applicant: MiQ Limited, Hong Kong (HK)

(72) Inventors: John Saint Quattro, Hong Kong (HK); Alexander Varlamov, Hong Kong (HK); Siu Ka Shan, Hong Kong (HK)

(73) Assignee: MiQ Limited, Hong Kong (HK)

( * ) Notice: Subject to any disclaimer, the term of this patent is extended or adjusted under 35 U.S.C. 154(b) by 0 days.

(21) Appl. No.: 15/593,309

(22) Filed: May 11, 2017

(65) Prior Publication Data

US 2017/0330540 A1    Nov. 16, 2017

Related U.S. Application Data

(60) Provisional application No. 62/334,458, filed on May 11, 2016.

(51) Int. Cl.
*A63H 5/00* (2006.01)
*G04B 13/00* (2006.01)
(Continued)

(52) U.S. Cl.
CPC ..... *G10H 1/0008* (2013.01); *G06F 17/30743* (2013.01); *G06F 17/30761* (2013.01); *G10H 2210/036* (2013.01); *G10H 2210/071* (2013.01); *G10H 2210/076* (2013.01); *G10H 2210/125* (2013.01)

(58) Field of Classification Search
CPC .......... H04S 2400/03; G10H 2240/131; G10H 2240/085; G10H 2240/135; G10H 2240/145; G10H 2210/031; G10H 2210/036; G10H 2240/125; G10H 2240/155; G10H 2240/121; G10H 2240/141; G10H 2240/325; G10K 11/178; B25F 1/04
See application file for complete search history.

(56) References Cited

U.S. PATENT DOCUMENTS

| 8,983,950 B2 | 3/2015 | Askey et al. |
| 2007/0048712 A1* | 3/2007 | Plastina ............... G09B 5/06 434/308 |

(Continued)

*Primary Examiner* — Marlon Fletcher
(74) *Attorney, Agent, or Firm* — Idea Intellectual Limited; Margaret A. Burke; Sam T. Yip

(57) ABSTRACT

A method of making audio music selection and creating a mixtape, comprising importing song files from a song repository; sorting and filtering the song files based on selection criteria; and creating the mixtape from the song files sorting and filtering results. The sorting and filtering of the song files comprise: spectral analyzing each of the song files to extract low level acoustic feature parameters of the song file; from the low level acoustic feature parameter values, determining the high level acoustic feature parameters of the analyzed song file; determining a similarity score of each of the analyzed song files by comparing the acoustic feature parameter values of the analyzed song file against desired acoustic feature parameter values determined from the selection criteria; and sorting the analyzed song files according to their similarity scores; and filtering out the analyzed song files with first similarity scores lower than a filter threshold.

8 Claims, 3 Drawing Sheets

(51) Int. Cl.
*G10H 1/00* (2006.01)
*G06F 17/30* (2006.01)

(56) References Cited

U.S. PATENT DOCUMENTS

| | | | |
|---|---|---|---|
| 2009/0056525 A1* | 3/2009 | Oppenheimber | G06F 17/30743 84/609 |
| 2009/0063414 A1* | 3/2009 | White | G06F 17/30017 |
| 2009/0063971 A1* | 3/2009 | White | G06F 3/04817 715/716 |
| 2009/0100459 A1* | 4/2009 | Riedl | H04N 21/2385 725/35 |
| 2009/0217804 A1* | 9/2009 | Lu | G10H 1/0058 84/602 |
| 2012/0078398 A1* | 3/2012 | Xu | G11B 27/105 700/94 |
| 2014/0080606 A1* | 3/2014 | Gillet | G10H 1/0008 463/35 |
| 2014/0195026 A1* | 7/2014 | Wieder | H04L 67/306 700/94 |
| 2014/0195919 A1* | 7/2014 | Wieder | H04L 67/306 715/730 |
| 2014/0280265 A1* | 9/2014 | Wang | H04L 67/42 707/758 |

* cited by examiner

METHOD AND APPARATUS FOR MAKING
MUSIC SELECTION BASED ON ACOUSTIC
FEATURES

CROSS-REFERENCES TO RELATED APPLICATIONS

This application claims priority to U.S. Patent Application No. 62/334,458 filed May 11, 2016; the disclosure of which is incorporated by reference in its entirety. This application is also related to U.S. Pat. No. 9,076,346 issued Jul. 7, 2015; the disclosure of which is incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to music theory, musical instruments, and the making, performance, selection, and playback of music. Particularly, the present invention relates to the selection of songs and making of song playlists or mixtapes based on the acoustic features of the songs.

BACKGROUND OF THE INVENTION

In recent years with most recorded music available in digital form, it became vastly accessible and convenient to average consumers to own or have access to large number of songs anytime anywhere. This in turn necessitates sorting and categorizing song files into collections, playlists, or mixtapes. Besides manual operations by users, many electronic devices and software programs, such as Apple's iTunes, Pandora, and Spotify, now existed to automatically sort and categorize a plurality of songs based on song attributes, user preferences, recommendations from group of multiple users, etc. Some of these electronic devices and software programs can also make automatic recommendations for inclusion of new songs in collections, playlists, or mixtapes by predicting the user's music tastes.

The most commonly used sorting and categorizing criteria include song attributes such as song artist, composer, release date, genre, country of origin; attributes on the user's listening habits such as play frequency, play count, and last play time and date; and attributes on listening habits of a community of users such as aggregated group rating on the song, popularity, and demographic of the user group. However, all of these criteria are based on extrinsic or predefined data of the song and nothing on the substance of the song itself. It is not known that any existing technology allows song sorting and categorizing by the acoustic features of the songs, which could enable sorting and categorizing criteria based on, for example, the mood (e.g. happy, sad, etc.) of the songs.

SUMMARY OF THE INVENTION

The present invention provides a method and an apparatus to generate a song collection, playlist, or mixtape using sorting and categorizing criteria that are based on one or more acoustic features of the songs. In one embodiment, the method comprises 1.) importing the audio digital data files (e.g. MP3 files) from a library or repository of songs; 2.) sorting and filtering the audio digital data files based on a set of selection criteria, which can be translated into one or more acoustic feature parameter values; and 3.) creating a song collection, playlist, or mixtape based on the sorted and filtered results, attaching a graphical cover art and title for the song collection, playlist, or mixtape, wherein the graphical cover art and the title may be suggested based on an analysis of the characteristics of the songs in the song collection, playlist, or mixtape.

BRIEF DESCRIPTION OF THE DRAWINGS

Embodiments of the invention are described in more detail hereinafter with reference to the drawings, in which.

DETAILED DESCRIPTION

In the following description, methods and systems for making song selection and creating song collections, playlists, or mixtapes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

Figure 1:
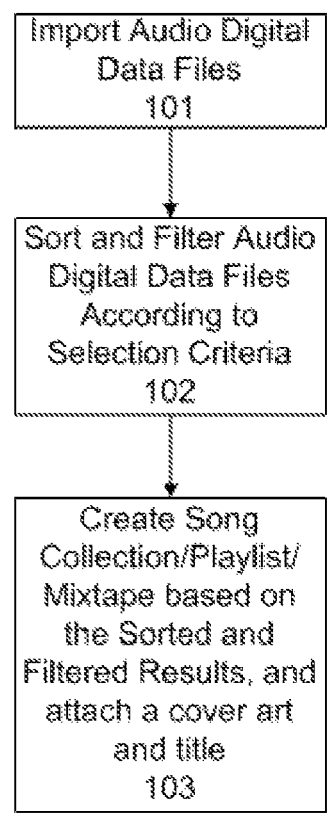
FIG. 1 depicts a flow chart of a method of making song selection and creating song collections, playlists, or mixtapes in accordance to one embodiment of the present invention.

Referring to FIG. 1. In accordance to one embodiment of the present invention, a method is provided to create a song collection, playlist, or mixtape. The method includes: 1.) importing the audio digital data files (101) from a library or repository of songs; 2.) sorting and filtering the audio digital data files based on a set of selection criteria (102); and 3.) creating a song collection, playlist, or mixtape from the sorted and filtered results, attaching a graphical cover art and title for the song collection, playlist, or mixtape (103), wherein the graphical cover art and the title maybe suggested based on an analysis of the characteristics of the songs in the song collection, playlist, or mixtape.

Figure 2:
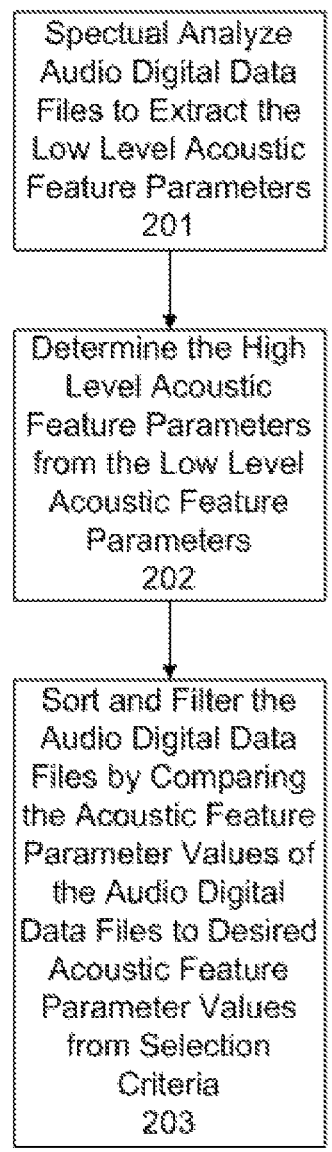
FIG. 2 depicts a flow chart of the step of sorting and filtering of the audio digital data files based on a set of selection criteria within the method of making song selection and creating song collections, playlists, or mixtapes.

Referring to FIG. 2. The sorting and filtering of the audio digital data files based on a set of selection criteria comprise the steps of: spectral analyzing each of the audio digital data files to extract the low level acoustic feature parameters (201); from the low level acoustic feature parameter values, determining the high level acoustic feature parameters (202); sorting and filtering the audio digital data files by comparing the acoustic feature parameter values of the audio digital data files to desired acoustic feature parameter values from the selection criteria (203).

The spectral analysis of an audio digital data file analyzes the data in each frame of the audio digital data file and extract the low level acoustic feature parameter values. The values of each low level acoustic feature parameter extracted over the entire set of frames (e.g. whole song) are then used to compute at least the minimum, maximum, variance, skewness, mean of derivative, variance of derivative, mean of second derivative, and variance of second derivative. Table 1 below listed the low level acoustic feature parameters extracted:

TABLE 1

| | Low Level Acoustic Feature Parameter | Description |
|---|---|---|
| 1 | Average Loudness | Dynamic range descriptor. It rescales average loudness, computed on 2 sec windows with 1 sec overlap, into the [0, 1] interval. The value of 0 corresponds to signals with large dynamic range, 1 corresponds to signal with little dynamic range |
| 2 | Dynamic Complexity | Dynamic complexity computed on 2 sec windows with 1 sec overlap |
| 3 | Silence Rate at 20 dB | Rate of silent frames in a signal for thresholds of 20 dB (mainly for detection of rate of speech in a spoken piece of audio) |
| 4 | Silence Rate at 30 dB | Rate of silent frames in a signal for thresholds of 30 dB (mainly for detection of rate of speech in a spoken piece of audio) |
| 5 | Silence Rate at 60 dB | Rate of silent frames in a signal for thresholds of 60 dB (mainly for detection of rate of speech in a spoken piece of audio) |
| 6 | Spectral RMS | The spectral RMS is used for estimating the meaningful spectral width/spread of frequencies |
| 7 | Spectral Flux | Spectral flux of a signal computed using L2-norm (Euclidean distance), for measuring how quickly the power spectrum of a signal is changing. Using the L2-norm algorithm, it compares the Euclidean distance between two frames of audio |
| 8 | Spectral Centroid | Centroid of the signal from FT. Mathematically indicates the 'center of mass' for the spectrum, and is perceived as a measure of brightness |
| 9 | Spectral Kurtosis | Moment statistic describing the gaussianity and tailedness of a signal when compared against a theoretical function |
| 10 | Spectral Spread | Measure of the bandwidth, similar to the flux |
| 11 | Spectral Skewness | Asymmetry of the probabilistic distribution of the spectrum across frames |
| 12 | Spectral Roll-off | Roll-off frequency of a spectrum. The roll-off frequency is defined as the frequency under which some percentage (cutoff) of the total energy of the spectrum is contained. The roll-off frequency can be used to distinguish between harmonic (below roll-off) and noisy sounds (above roll-off) |
| 13 | Spectral Decrease | Slope between frames |
| 14 | High Frequency Content | High frequency content. Similar to Spectral Centroid, but not magnitude adjusted |
| 15 | Spectral Strong Peak | Strong peak is defined as the ratio between the spectrum's maximum peak's magnitude and the "bandwidth" of the peak above a threshold (half its amplitude). This ratio reveals whether the spectrum presents a very "pronounced" maximum peak (i.e. the thinner and the higher the maximum of the spectrum is, the higher the ratio value) |
| 16 | Zero Crossing Rate | The zero-crossing rate of an audio signal. It is the number of sign changes between consecutive signal values divided by the total number of values. Noisy signals tend to have higher zero-crossing rate. In order to avoid small variations around zero caused by noise, a threshold around zero is given to consider a valid zero crossing whenever the boundary is crossed. |
| 17 | Spectral Energy | Computes the overall energy of the spectrum |
| 18 | Spectral Energy Band Low | Spectral energy in frequencies [20 Hz, 150 Hz] |
| 19 | Spectral Energy Band Middle Low | Spectral energy in frequencies [150 Hz, 800 Hz] |
| 20 | Spectral Energy Band Middle High | Spectral energy in frequencies [800 Hz, 4 kHz] |
| 21 | Spectral Energy Band Middle High | Spectral energy in frequencies [800 Hz, 4 kHz] |
| 22 | Mel-bands | Mel-frequency cepstrum coefficients in 40 bands computed by MFCC-FB40 |
| 23 | Filter bank | Filter bank of 40 bands from 0 to 11000 Hz |
| 24 | Log of Mel-bands | Log value of the spectrum energy in each mel-band |
| 25 | DCT | DCT of the 40 bands down to 13 mel coefficients |
| 26 | Bark Bands | Spectral energy in 27 bark bands, which correspond to an extrapolation of the bark band scale: [0.0, 50.0, 100.0, 150.0, 200.0, 300.0, 400.0, 510.0, 630.0, 770.0, 920.0, 1080.0, 1270.0, 1480.0, 1720.0, 2000.0, 2320.0, 2700.0, 3150.0, 3700.0, 4400.0, 5300.0, 6400.0, 7700.0, 9500.0, 12000.0, 15500.0, 20500.0, 27000.0] |
| 27 | ERB Bands | Energies/magnitudes in 40 bands spaced on an Equivalent Rectangular Bandwidth (ERB) scale, given a spectrum. It applies a frequency domain filter bank using gammatone filters |
| 28 | MFCC | First 13 mel frequency cepstrum coefficients |
| 29 | GFCC | First 13 gammatone feature cepstrum coefficients |
| 30 | Bark Banks Crest | Crest over energies in the bark bands spectrum |
| 31 | Bark Banks Flatness dB | Flatness over energies in the bark bands spectrum |
| 32 | Bark Banks Kurtosis | Moment statistic describing the gaussianity and tailedness over the bark bands spectrum |
| 33 | Bark Banks Skewness | Asymmetry of the probabilistic distribution of the barkbands spectrum across frames |
| 34 | Bark Banks Spread | Measure of the spread of the bark bands spectrum |
| 35 | Mel-bands Crest | Crest over energies in the mel-bands spectrum |
| 36 | Mel-bands Flatness dB | Flatness over energies in the mel-bands spectrum |
| 37 | Mel-bands Kurtosis | Moment statistic describing the gaussianity and tailedness over the mel-bands spectrum |
| 38 | Mel-bands Skewness | Asymmetry of the probabilistic distribution of the mel-bands spectrum across frames |
| 39 | Mel-bands Spread | Measure of the spread of the mel-bands spectrum |
| 40 | ERB Bands Crest | Crest over energies in the ERB bands spectrum |
| 41 | ERB Bands Flatness dB | Flatness over energies in the ERB bands spectrum |
| 42 | ERB Bands Kurtosis | Moment statistic describing the gaussianity and tailedness over the ERB bands spectrum |
| 43 | ERB Bands Skewness | Asymmetry of the probabilistic distribution of the ERB bands spectrum across frames |
| 44 | ERB Bands Spread | Measure of the spread of the ERB bands spectrum |
| 45 | Dissonance | Sensory dissonance of a spectrum |
| 46 | Spectral Entropy | Shannon entropy of a spectrum |
| 47 | Pitch Salience | Pitch salience of a spectrum. The pitch salience is given by the ratio of the highest autocorrelation value of the spectrum to the non-shifted autocorrelation value. Pitch salience was designed as quick measure of tone sensation. Unpitched sounds (nonmusical sound effects) and pure tones have an average pitch salience value close to 0 whereas sounds containing several harmonics in the spectrum tend to have a higher value |
| 48 | Spectral Complexity | Based on the number of peaks in the input spectrum |

TABLE 1-continued

| | Low Level Acoustic Feature Parameter | Description |
|---|---|---|
| 49 | Spectral Contrast Coeffs | Spectral Contrast Coefficient |
| 50 | Spectral Contrast Valleys | Magnitudes of the valleys |
| 51 | Beats Positions | Time positions (sec) of the detected beats using a beat tracking algorithm |
| 52 | Beats Count | Number of detected beats |
| 53 | BPM | Tempo in beats per minute |
| 54 | BPM Histogram First Peak BPM | Value for the highest peak (bpm) |
| 55 | BPM Histogram First Peak Weight | Weight of the highest peak |
| 56 | BPM Histogram First Peak Spread | Spread of the highest peak |
| 57 | BPM Histogram Second Peak BPM | Value for the second highest peak (bpm) |
| 58 | BPM Histogram Second Peak Weight | Weight of the second highest peak |
| 59 | BPM Histogram Second Peak Spread | Spread of the second highest peak |
| 60 | Beats Loudness | Loudness computed only on the beats, both on the whole frequency range and on each specified frequency band within 6 frequency bands |
| 61 | Beats Loudness Bands Ratio | Ratio between the 6 frequency bands |
| 62 | Onset Rate | Number of detected onsets per second |
| 63 | Danceability | Values from 0 to 3, where the higher the more danceable |
| 64 | Tuning Frequency | Estimated tuning frequency in Hz |
| 65 | HPCP | 32-dimensional harmonic pitch class profile. Computes a Harmonic Pitch Class Profile (HPCP), that is a k*12 dimensional vector which represents the intensities of the twelve (k == 1) semitone pitch classes (corresponding to notes from A to G#), or subdivisions of these (k > 1). It does this from the spectral peaks of a signal |
| 66 | THPCP | Transposed version of HPCP |
| 67 | HPCP Entropy | Shannon entropy of a HPCP vector |
| 68 | Key Key | Tonality of the audio in a key |
| 69 | Key Scale | Detected scale |
| 70 | Key Strength | Apparent strength of the key in the audio |
| 71 | Chords Strength | Strengths of detected chords |
| 72 | Chords Histogram | Histogram of chord progression |
| 73 | Chords Change Rate | Rate of chord changes in the progressions |
| 74 | Chords Number Rate | Number of different chords in a progression |
| 75 | Chords Key | Key of the chords detected |
| 76 | Chords Scale | The scale that progression is in |
| 77 | Tuning Diatonic Strength | Key strength estimated from high-resolution HPCP (120 dimensions) using diatonic profile |
| 78 | Tuning Equal Tempered Variation | Equal-temperament deviation estimated from high-resolution HPCP (120 dimensions) |
| 79 | Tuning Non-tempered Energy Ratio | Non-tempered energy ratio estimated from high-resolution HPCP (120 dimensions) |

From the above low level acoustic feature parameter minimum, maximum, variance, skewness, mean of derivative, variance of derivative, mean of second derivative, and variance of second derivative values, high level feature parameters are modeled. In one embodiment, the high level acoustic feature parameters include those listed in Table 2 below.

TABLE 2

| | High Level Feature Parameter | Possible Value |
|---|---|---|
| 1 | Danceability | True or false |
| 2 | Vocal Gender (relevant for vocal tracks) | Male or female |
| 3 | Genre (Dortmund set) | Type values within the Dortmund set |
| 4 | Genre (Electronic Music) | Type values within electronic music |
| 5 | Genre (Rosamerica set) | Type values within the Rosamerica set |
| 6 | Genre (Tzanetakis set) | Type values within the Tzanetakis set |
| 7 | Rhythm | Values within the ISMIR04 set |
| 8 | Mood (Acoustic) | True or false |
| 9 | Mood (Aggressive) | True or false |
| 10 | Mood (Electronic) | True or false |
| 11 | Mood (Happy) | True or false |
| 12 | Mood (Party) | True or false |
| 13 | Mood (Relax) | True or false |
| 14 | Mood (Sad) | True or false |
| 15 | Timbre | Bright or dark |
| 16 | Tone | Tonal or atonal |
| 17 | Voice/instrumental | Voice or instrumental |

In one embodiment of the high level acoustic feature parameter modeling, the value of each of the high level feature parameter is computed using statistical aggregation, which can be based on a weighted sum of one or more low level acoustic feature parameter's minimum, maximum, variance, skewness, mean of derivative, variance of derivative, mean of second derivative, and variance of second derivative values. For example, Danceability is determined by:

$$D = C_{AL} * \text{Average Loudness's maximum} + C_{BC} * \text{Beats Count's minimum} + C_{ZCR} * \text{Zero Cross Rate's mean; where:}$$

$C_{AL}$ is the weight coefficient for Average Loudness;
$C_{BC}$ is the weight coefficient for Beats Count; and
$C_{ZCR}$ is the weight coefficient for Zero Cross Rate; and
if D>a threshold value, then Danceability is true.

The extracted low level acoustic feature parameter values and the high level acoustic feature parameter values of the analyzed song are indexed and stored in a song acoustic feature database with reference to the analyzed song. With the songs in the accessible library or repository continuously being imported and analyzed, their acoustic feature parameter values extracted, computed, indexed and stored. This allows the rapid retrieval of the acoustic feature parameter values of any song in the library or repository during the composition of a song collection, playlist, or mixtape. This in turn speeds up the song sorting and categorizing response time perceived by the user.

The subsequent sorting and filtering of the audio digital data files by matching the acoustic feature parameters' similarity score values to the selection criteria comprise receiving a user input indicating the sorting and filtering criteria for compiling the song collection, playlist, or mixtape. In one embodiment, the user input includes, but not limited to, scaled values of tempo, intensity, bass level, treble level, rhythm, mood, and energy. These scaled values are then interpreted into desired acoustic feature parameter values. In one embodiment, only high level acoustic feature parameter values are interpreted; in other embodiments, it is possible that both low level and high level acoustic feature parameter values are interpreted. The analyzed songs' acoustic feature parameter values stored in the song acoustic feature database are retrieved to compare against the desired acoustic feature parameter values. The comparison is conducted by computing a similarity score for each song by a trained mean squared errors (MSE) function defined by:

$$s = \frac{1}{n}\sum_{i=1}^{n}[c_i(x_i - y_i)^2];$$

where:
- s is the similarity score;
- n is the total number of acoustic feature compared;
- $c_i$ is the importance coefficient for the acoustic feature i;
- $x_i$ is the song's acoustic feature i parameter value; and
- $y_i$ is the desired acoustic feature i parameter value.

Thus, the sorting of the analyzed songs is such that the higher the similarity score, the higher the ranking of the song in the compiled song collection, playlist, or mixtape. Further, a filter threshold can be used to filter out songs with similarity scores lower than the filter threshold.

To further enhance the speed performance, a similarity matrix can be pre-compiled and stored in the song acoustic feature database. In the compilation of the similarity matrix, each analyzed song having a corresponding data record of acoustic feature parameter values is compared against another to obtain a similarity score. In one embodiment, a data record of the similarity matrix may take the form of that shown in Table 3 below.

TABLE 3

| Song ID ($x_i$) | Song ID ($x_j$) | Similarity Score |
| --- | --- | --- | where $x_i$ identifies one analyzed song and $x_j$ identifies a different analyzed song. With the similarity matrix, once an analyzed song is added to a song collection, playlist, or mixtape, other candidate songs having similar acoustic features can be identified quickly by looking up the similarity matrix. To optimize the size of the similarity matrix, song pairs that are too dissimilar (e.g. below a similarity threshold) are excluded. Also, song pairs with identical acoustic features are also excluded.

With the list of sorted and filtered songs, a song collection, playlist, or mixtape is formed. In one embodiment, the graphical cover art to be attached to the song collection, playlist, or mixtape can be selected manually by user. In another embodiment, it can be generated automatically by a cover art generator. The cover art generator takes one or more image generation seeds (e.g. random pixel values) and one or more statistical aggregations of the constituent songs' acoustic feature parameter (e.g. mood) values as input and uses them as coefficients to generate a fractal-based image. In yet another embodiment, the graphical cover art to be attached can be recommended based on the results from an image search query in an image database having a plurality of graphics art images stored there within or the Internet using one or more constituent songs' metadata such as song artist name, song title, and release information. The concatenation of whole or parts of the metadata of more than one constituent songs may be used to form the image search key word.

A title picker may be used to recommend one or more titles for the compiled song collection, playlist, or mixtape using one or more concatenations of two or more constituent songs' artist names and titles. The recommended titles may also take reference to the prominent acoustic feature parameters of the constituent songs. In this case, the title picker detects the tag-style output of the high level acoustic feature parameter values to construct mood-based titles (e.g. "Happy" and "Sad"), and then combine them with other metadata of the constituent songs or contextual information, such as the time of day or weather to generate the title recommendations.

Figure 3:
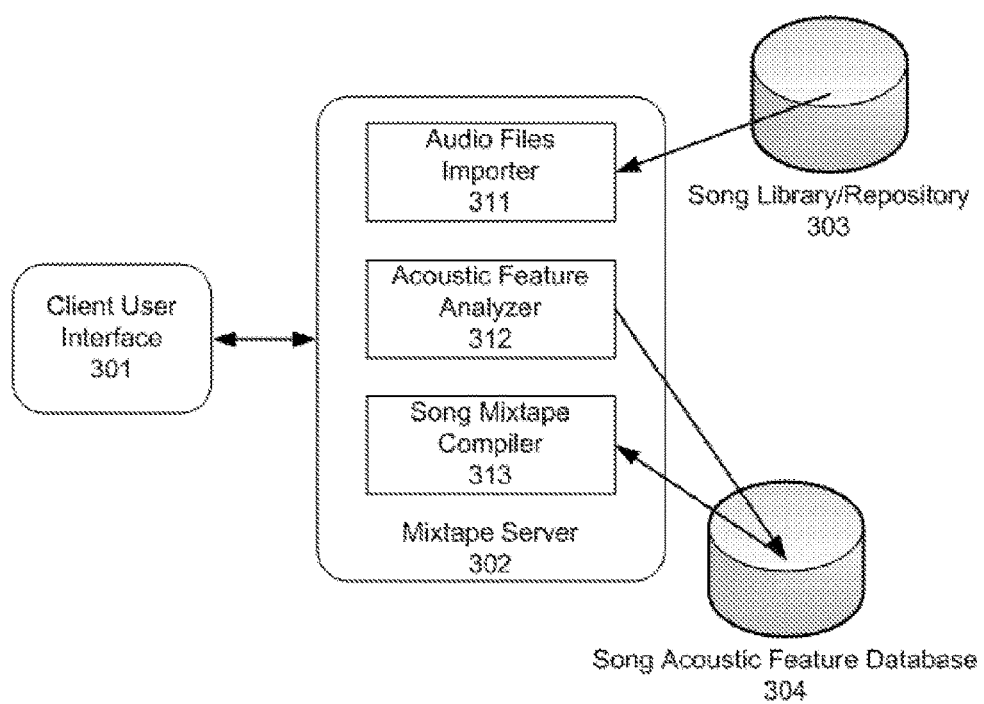
FIG. 3 depicts a system diagram of a system making song selection and creating song collections, playlists, or mixtapes in accordance to one embodiment of the present invention.

In accordance to one embodiment of the present invention, the method of making song selection and creating song collections, playlists, or mixtapes is implemented by a system shown in FIG. 3. The system comprises at least a user interface 301, a server 302, and a song acoustic feature database 304. The user interface 301 can be executed by a personal computer, laptop computer, mobile computing device such as "smartphone" and "tablet" computer. The user interface 301 allows a user to specify the songs (e.g. specify the location of a song library or repository) to be analyzed, sorted, filtered, and included in a collection, playlist, or mixtape. The user interface 301 also allows the user to input her selection criteria (e.g. in the form of desired acoustic feature parameter values, or simplified interpretation of the same). The user interface 301 takes the user input and sends to the server 302. The server 302 comprises audio files importer module 311, acoustic feature analyzer 312, and song mixtape compiler 313. According to the input received from the user interface 301, the audio files importer imports the song audio data files from the user-specified song library/repository to be analyzed, sorted, and filtered by the acoustic feature analyzer 312. The acoustic feature analyzer 312 also store the extracted and determined acoustic feature parameter values corresponding to each song analyzed in the song acoustic feature database 304 (optionally along with the computed similarity matrix). The song mixtape compiler compares the songs' acoustic feature parameter values against the desired acoustic feature parameter values as specified in the user's selection criteria to sort and filter the analyzed songs and include in a song collection, playlist, or mixtape. The information of the compiled song collection, playlist, or mixtape is then sent back to the user interface 301.

The electronic embodiments disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

All or portions of the electronic embodiments may be executed in one or more general purpose or computing devices including server computers, personal computers, laptop computers, mobile computing devices such as "smartphones" and "tablet" computers.

The electronic embodiments include computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A method of making audio music selection and creating a mixtape, comprising:
   importing one or more audio digital data files from an audio music repository;
   sorting and filtering the audio digital data files based on one or more selection criteria;
   creating the mixtape from the audio digital data files sorting and filtering results, the results comprising one or more sorted and filtered audio digital data files;
   wherein the sorting and filtering of the audio digital data files comprise:
      spectral analyzing each of the audio digital data files to extract one or more low level acoustic feature parameters of the audio digital data file;
      from the low level acoustic feature parameter values, determining one or more high level acoustic feature parameters of the analyzed audio digital data file;
      determining a first similarity score of each of the analyzed audio digital data files by comparing the acoustic feature parameter values of the analyzed audio digital data file against desired acoustic feature parameter values determined from the selection criteria; and
      sorting the analyzed audio digital data files according to their first similarity scores; and
      filtering out the analyzed audio digital data files with first similarity scores lower than a filter threshold; and
   compiling a similarity matrix comprising a second similarity score of each of the analyzed audio digital data file comprising:
      determining the second similarity score of each of the analyzed audio digital data files by comparing the acoustic feature parameter values of the analyzed audio digital data file against the acoustic feature parameter values of another one of the analyzed audio digital data files;
      including the second similarity score in the similarity matrix with reference to the two analyzed audio digital data files compared;
      excluding second similarity scores that are identical from the similarity matrix; and
      excluding second similarity scores that are below a similarity threshold from the similarity matrix;
   wherein the the similarity matrix is used to identify candidate audio digital data files with similar acoustic feature to those audio digital data files in the mixtape.

2. The method of claim 1, wherein the first similarity score the analyzed audio digital data file is defined by:

$$s = \frac{1}{n}\sum_{i=1}^{n}[c_i(x_i - y_i)^2];$$

wherein:
   s is the first similarity score of the analyzed audio digital data file;
   n is total number of acoustic feature parameters compared;
   $c_i$ is an importance coefficient for the acoustic feature parameter i;
   $x_i$ is the analyzed audio digital data file's acoustic feature parameter i's value; and
   $y_i$ is the desired acoustic feature parameter i's value.

3. The method of claim 1, further comprising:
   storing the extracted low level acoustic feature parameter values and determined low level acoustic feature parameter values of each analyzed audio digital data file in an acoustic feature database with reference to the analyzed audio digital data file for rapid retrieval of the acoustic feature parameter values.

4. The method of claim 1, wherein the selection criteria include scaled values of tempo, intensity, bass level, treble level, rhythm, mood, and energy of a song.

5. The method of claim 1, wherein the values of each of the low level acoustic feature parameters are extracted over an entire set of frames of the audio digital data file and computed for at least a minimum, a maximum, a variance, a skewness, a mean of derivative, a variance of derivative, a mean of second derivative, and a variance of second derivative of each of the values of each of the low level acoustic feature parameters.

6. The method of claim 1, wherein the low level acoustic feature parameters include danceability, vocal gender, genre, rhythm, mood, timbre, tone, and voice/instrumental.

7. The method of claim 1, further comprising:
   generating a cover art for the mixtape by using one or more statistical aggregations of one or more constituent audio digital data files' acoustic feature parameter values as coefficients to generate a fractal-based image for the cover art.

8. The method of claim 1, further comprising:
   generating a title for the mixtape by concatenating one or more high level acoustic feature parameter values of one or more constituent audio digital data files and one or more metadata of one or more constituent audio digital data files.

* * * * *